United States Patent
Cho et al.

(10) Patent No.: US 9,864,447 B2
(45) Date of Patent: Jan. 9, 2018

(54) ULTRA HIGH RESOLUTION FLAT PANEL DISPLAY HAVING IN-CELL TYPE TOUCH SENSOR

(71) Applicant: LG Display Co., Ltd., Seoul (KR)

(72) Inventors: SeongJun Cho, Paju-si (KR); Kakyung Kim, Paju-si (KR); Euihyun Chung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 150 days.

(21) Appl. No.: 14/951,130

(22) Filed: Nov. 24, 2015

(65) Prior Publication Data
US 2016/0188061 A1 Jun. 30, 2016

(30) Foreign Application Priority Data

Dec. 30, 2014 (KR) .................. 10-2014-0194431

(51) Int. Cl.
| | |
|---|---|
| *G06F 3/041* | (2006.01) |
| *G06F 3/044* | (2006.01) |
| *G09G 3/36* | (2006.01) |
| *G09G 3/20* | (2006.01) |
| *G02F 1/1333* | (2006.01) |
| *G02F 1/1343* | (2006.01) |

(52) U.S. Cl.
CPC ........ *G06F 3/0412* (2013.01); *G02F 1/13338* (2013.01); *G06F 3/044* (2013.01); *G06F 3/0416* (2013.01); *G09G 3/2096* (2013.01); *G09G 3/3648* (2013.01); *G02F 2001/134372* (2013.01)

(58) Field of Classification Search
CPC ...... G06F 3/0412; G06F 3/0416; G06F 3/044; G02F 1/13338; G09G 3/2096; G09G 3/3648

USPC .......................................................... 345/173
See application file for complete search history.

(56) References Cited

U.S. PATENT DOCUMENTS

| | | | |
|---|---|---|---|
| 6,864,565 B1 * | 3/2005 | Hool | H01L 23/3114 257/666 |
| 7,009,297 B1 * | 3/2006 | Chiang | H01L 21/4832 257/738 |

(Continued)

FOREIGN PATENT DOCUMENTS

KR    10-2012-0078100 A    7/2012

OTHER PUBLICATIONS

European Extended Search Report, European Application No. 15201055.9, May 25, 2016, 6 pages.

*Primary Examiner* — Fred Tzeng
(74) *Attorney, Agent, or Firm* — Fenwick & West LLP

(57) ABSTRACT

A display having a touch sensor comprises: a plurality of pixel areas disposed in a matrix manner on a substrate; a routing line running along a first direction on the substrate; a first passivation layer covering the routing line; a touch electrode covering the routing line and corresponding to a grouped pixel areas on the first passivation layer; a touch contact hole exposing some portions of the routing line by penetrating the touch electrode and the first passivation layer; a second passivation layer covering the touch electrode; a passivation contact hole exposing the touch contact hole and some portions of the touch electrode around the touch contact hole by penetrating the second passivation layer; and a touch terminal connecting the touch electrode and the routing line on the second passivation layer.

8 Claims, 9 Drawing Sheets

(56) References Cited

U.S. PATENT DOCUMENTS

| | | | |
|---|---|---|---|
| 7,094,676 B1* | 8/2006 | Leu | H01L 23/3128 |
| | | | 257/E23.178 |
| 7,129,113 B1* | 10/2006 | Lin | H01L 24/82 |
| | | | 257/698 |
| 7,262,082 B1* | 8/2007 | Lin | H01L 21/6835 |
| | | | 257/698 |
| 7,811,863 B1* | 10/2010 | Lin | H01L 21/565 |
| | | | 257/E21.502 |
| 7,993,983 B1* | 8/2011 | Lin | H01L 21/6835 |
| | | | 438/106 |
| 2012/0127414 A1 | 5/2012 | Shin | |
| 2012/0268396 A1 | 10/2012 | Kim et al. | |
| 2014/0028925 A1* | 1/2014 | Choi | G02F 1/13338 |
| | | | 349/12 |
| 2014/0285462 A1* | 9/2014 | Lee | G09G 3/3648 |
| | | | 345/173 |
| 2016/0188040 A1* | 6/2016 | Shin | G06F 3/047 |
| | | | 345/174 |
| 2016/0216800 A1* | 7/2016 | Cho | G06F 3/044 |
| 2016/0320882 A1* | 11/2016 | Kim | G06F 3/044 |
| 2017/0060317 A1* | 3/2017 | Kim | G06F 3/0416 |

* cited by examiner

US 9,864,447 B2

ULTRA HIGH RESOLUTION FLAT PANEL DISPLAY HAVING IN-CELL TYPE TOUCH SENSOR

CROSS-REFERENCE TO RELATED APPLICATIONS

This application claims the benefit of Korea Patent Application No. 10-2014-0194431 filed on Dec. 30, 2014, which is incorporated herein by reference for all purposes as if fully set forth herein.

BACKGROUND

Technical Field

The present disclosure relates to an ultra high resolution flat panel display having an in-cell type touch sensor. Specifically, the present disclosure relates to an ultra high resolution flat panel display having the in-cell type touch sensor in which the parasitic capacitance between the touch electrode and the routing line is reduced and the storage capacitance between the common electrode and the pixel electrode can be ensured enough.

Discussion of the Related Art

Recently, as increasing the needs for display representing the various multimedia data, the flat panel displays are developed in large area with low price and high quality (high video quality, ultra high resolution, increased brightness, real color representation ability, etc.). These flat panel displays are equipped with various input devices for interfacing with the user, including keyboard, mouse, track-ball, joystick, digitizer, and so on.

However, the above mentioned input devices should have enough space for installing into the display and for working space. Further, sometimes the users have to learn how to use these input devices. Therefore, easy and simple input devices for the display are required. One solution is the touch sensor by which the user can input information directly on the screen of the display with fingers or a touch pen while seeing the display.

The touch sensor has less errors and simple structure. User can input and/or select his/her instructions by simply touching the screen of the display without any input devices, easily and quickly. With this easiness, the touch sensors are applied to the various display system.

According to the structure, a touch sensor can be categorized into the add-on type, the on-cell type, and the integrated type (or in-cell type). In the add-on type touch sensitive display, the touch sensor is attached on the top surface of the display after the display and the touch sensor are manufactured separately. In the on-cell type touch sensitive display, the elements for the touch sensor are formed on the top substrate of the display, directly. In the in-cell type touch sensitive display the elements for the touch sensor are manufactured into the display panel. Therefore, the in-cell type can be much thinner than other types of touch sensitive displays and has a much longer life time and endurance.

Especially, for the in-cell type, since the common electrode of the display pixels can be used as the touch electrode of the touch sensor, the thickness of the display having touch sensor can be thinner. As the elements for the touch sensors are formed into the display device, the touch sensor can endure a large number of touch actions. Nowadays, the in-cell type is prevalent among the touch sensors embedded in display systems.

The in-cell type touch sensor can be categorized into the photo type and the capacitance type in accordance with the sensing method. Further, the capacitance type can be divided into the self capacitance type and the mutual capacitance type.

The self capacitance type is that a plurality of patterns are formed at the touch area and the variations of the capacitance of each pattern are detected for deciding where the touch occurred. The mutual capacitance type is one where a matrix type array of the X-axis electrodes and the Y-axis electrodes are formed at the touch area, and the touch action can be detected by applying the driving pulse to the X-axis electrode and by detecting the variations of the voltage at the sensing nodes from the Y-axis electrodes. The sensing nodes can be defined by the crossing point of the X-axis electrodes and the Y-axis electrodes.

However, for the mutual capacitance type touch sensor, the amount of the mutual capacitance generated at sensing the touch is low, but the parasitic capacitances between the gate line and the date line included into the display are high. Therefore, it may be hard to exactly decide where the touch action is detected, due to the interference of the parasitic capacitance.

Further, for the multi touch sensing, the mutual capacitance type touch sensor should have a plurality of touch driving lines for touch driving and a plurality of touch sensing lines for touch sensing on the common electrode. Therefore, the line structure would be very complicated.

Having the high touch resolution with the simple line structure, the self capacitance (type) touch sensor is more widely used than the mutual capacitance touch sensor.

FIGS. 1 and 2, illustrate a liquid crystal display having the self capacitance touch sensor (or, 'touch sensor embedded display') according to the related art. FIG. 1 is a plane view illustrating the structure of the touch sensor embedded in a display according to the related art. FIG. 2 is a plane view illustrating the enlarged part having two touch electrodes (Tx) denoted as ⓐ in FIG. 1.

Referring to FIG. 1, the display having the self capacitance touch sensor has the display area AA and the non-display area (or 'bezel area') NA. The display area AA is the area in which the touch electrodes used as the common electrode are formed and the video information is represented. The non-display area NA surrounding the display area AA is the area in which various lines and the touch driving circuit IC are formed.

The display area AA includes a plurality of touch electrodes Tx arrayed along to the first direction (for example, X-axis) and the second direction (for example Y-axis) crossing to the first direction, and a plurality of routing line TW along to the second direction. For example, the touch electrodes Tx may be arrayed in a matrix manner of N block×M block (N rows×M columns).

The plurality of touch electrodes Tx arrayed in the display area AA may be formed by dividing the common electrode of the liquid crystal display. During the display mode, for representing the video data, a common electrode can work as the common electrode. During the touch driving mode, for sensing touch action, the common electrode can work as the touch electrode.

FIG. 2 illustrates an area where two neighboring touch electrodes Tx in the vertical direction (the second direction, or Y-axis). At one touch electrode Tx, a plurality of pixel area PA may be allocated. In FIG. 2, the nine pixel areas PA arrayed in a 3×3 matrix manner are allocated at each touch electrode Tx. However, more pixel areas PA can be allocated at each touch electrode Tx.

Any one pixel area PA is defined by the crossing structure of the gate line GL running along the first direction (or X-axis direction) and the data line DL running along the second direction (or Y-axis). In the pixel area PA, main elements for the display are disposed. In the example of the liquid crystal display of FIG. 2, a thin film transistor T connected to the gate line GL and the data line DL and the liquid crystal cell LC driven by the thin film transistor T may be disposed.

In each pixel area PA, one pixel electrode PXL is disposed. The pixel electrode PXL is connected to the thin film transistor T and is applied with a driving voltage corresponding to the video information via the data line DL. For driving the liquid crystal cell LC by the driving voltage applied to the pixel electrode PXL, the common electrode COM is disposed as facing the pixel electrode PXL. The common electrode COM may be disposed in each pixel area PA individually. On the other hand, for the driving stability of the liquid crystal cell LC, it is prefer that the common electrodes of all pixel areas are commonly connected.

When touch electrode Tx is formed, to simplify the structure, the touch electrode Tx may be used as the common electrode COM. Here, each common electrode COM is formed as covering every 9 pixel areas PA. Further, these common electrodes are used as the touch electrode Tx.

All pixel areas PA are grouped into 3×3 matrix manners, each common electrode COM covering every 3×3 pixel areas PA can be designed as each touch electrode. For example, as shown in FIG. 2, the first common electrode covering the first group of 3×3 pixel areas PA can be defined as the 1row 1column touch electrode T11. The common electrode covering the right neighboring group of 3×3 pixel areas PA can be defined as the 1row 2column touch electrode T12. The common electrode covering the lower side neighboring group of 3×3 pixel area PA can be defined as the 2row 1coloumn touch electrode T21, and the common electrode covering the diagonal side neighboring group of 3×3 pixel area PA can be defined as the 2row 2column touch electrode T22.

Each touch electrode Tx may have one routing line TW. For example, the 1row 1column touch electrode T11 connects to the 1row 1column routing line TW11. The 2row 1column touch electrode T21 connects to the 2row 1column routing line TW21. The routing lines TW may be disposed as overlapping with the data line DL with an insulating layer there-between. Otherwise, the routing lines TW may be disposed at the same layer with the data line DL with a predetermined distance from the data line DL. In that case, the aperture ratio may be reduced.

The non-display area NA surrounds the display area AA and includes the integrated circuit for data driving and touch driving IC and various lines. The integrated circuit for data driving and touch driving IC drives the gate lines GL, supplies the video data to the data line DL and supplies the common voltage to the touch electrode Tx (the common electrode) at the display mode. Further, during the touch mode, the integrated circuit IC for data driving and touch driving supplies the touch driving voltage to the touch electrode Tx. By scanning the variations of the capacitance at the touch electrode Tx, it is decided that which touch electrode Tx is touched.

The various lines include the routing lines TW connected to each touch electrode Tx and the gate lines GL and the data lines DL connected to the integrated circuit for data driving and touch driving IC.

FIGS. 3 and 4 illustrate the connecting structure of the touch electrode and the routing line in the liquid crystal display having the self capacitance touch sensor. FIG. 3 is a plan view illustrating an enlarged area including two neighboring pixels denoted as (b) in FIG. 2 according to the related art. FIG. 4 is a cross section view, along the cutting line I-I' of FIG. 3, illustrating the structure of the liquid crystal display having the self capacitance touch sensor according to the related art.

Referring to FIGS. 3 and 4, the liquid crystal display having the self capacitance touch sensor according to the related art includes a plurality of pixel areas PA arrayed in a matrix manner by the crossing structure of the gate line GL and the data line DL on the substrate SUB. Each of the pixel areas PA includes a thin film transistor T, a pixel electrode PXL connected to the thin film transistor T, and a common electrode COM facing with the pixel electrode PXL.

The thin film transistor T may have the double gate structure in which the semiconductor layer is overlapped with the gate line GL twice so that two channel areas A are formed. On the substrate SUB, a light shielding layer LS may be formed where the channel area A is disposed. On the light shielding layer LS, a buffer layer BUF is deposited as covering the whole surface of the substrate SUB. On the buffer layer BUF, a semiconductor layer is disposed where the light shielding layer LS is formed. On the semiconductor layer, a gate line GL and the gate electrode G are disposed with a gate insulating layer GI.

One side of the semiconductor layer is connected to the date line DL. The semiconductor layer has a 'U' shape so as to cross the gate line GL twice. The overlapped portion of the gate line GL with the semiconductor layer would be the gate electrode G. The portions of the semiconductor layer overlapped with the gate electrode G would be the channel area A. On the whole surface of the substrate SUB having the gate line GL and the gate electrode G, an intermediate insulating layer IN is deposited.

On the intermediate insulating layer IN, data line DL is disposed. One portion of the data line DL is connected to the one side of the semiconductor layer. The other side of the semiconductor layer is connected to the drain electrode D. Here, the source electrode S is not formed separately but is defined as the portion of the data line DL overlapped with the semiconductor layer. The drain electrode D may be formed separately. Otherwise, one portion of the pixel electrode PXL connected to the other side of the semiconductor layer may be the drain electrode D.

On the whole surface of the substrate SUB having the thin film transistor T including the gate electrode G, the source electrode S and the drain electrode D, a planar layer PAC is deposited. On the planar layer PAC, the common electrode COM is disposed. In order to be used as the touch electrode Tx, the common electrode COM may be patterned as covering the grouped pixel areas. Further, the common electrode COM, also being the touch electrode Tx, preferably has the open structure in which it does not cover the pixel contact hole PH exposing the drain electrode D.

On the whole surface of the substrate SUB having the common electrode COM, a first passivation layer PAS1 is deposited. On the first passivation layer PAS1, a routing line TW (e.g., TW11) is formed. In order to ensure enough aperture ratios, the routing line TW is preferably overlapped with the data line DL. On the whole surface of the substrate SUB having the routing line TW, a second passivation layer PAS2 is deposited. Each routing line TW is connected to one touch electrode Tx. Therefore, by patterning the second passivation layer PAS2 and the first passivation layer PAS1, the touch contact hole TH exposing one portion of the touch electrode Tx and the routing contact hole WH exposing one portions of the routing line TW are formed.

On the second passivation layer PAS2, the pixel electrode PXL is formed. The pixel electrode PXL connects to the drain electrode D of the thin film transistor T through the pixel contact hole PH. Within the pixel area PA, the pixel electrode PXL is disposed as overlapping with the common electrode COM with the second passivation layer PAS2 and the first passivation layer PAS1 there-between. Here, using the same material with the pixel electrode PXL, the touch connecting terminal TT is formed. The touch connecting terminal TT electrically/physically connects the touch electrode Tx exposed through the touch contact hole TH to the routing line TW exposed through the routing contact hole WH.

Like this, the routing line TW extends along to the second direction, e.g., Y axis. Therefore, any one routing line TW may overlap with the touch electrodes Tx arrayed along the Y-axis. For example, 2row 1column routing line TW21 connects to the 2row 1column touch electrode Tx21 and overlaps with other touch electrodes Tx arrayed at lower side from the 2row 1column touch electrode Tx21 along to the Y-axis with the first passivation layer PAS1 there-between.

When the parasitic capacitance between the 2row 1column routing line TW21 and other touch electrodes Tx, the sensing accuracy may be lowered. Therefore, it is required that a high insulating property should be ensured between the touch electrode Tx and the routing line TW. For example, it is preferable that the first passivation layer PAS1 has a thickness of 2,000 Å or more to reduce the electrostatic noise between the touch electrode Tx and the routing line TW. In that case, however, the capacitance between the pixel electrode PXL and the common electrode COM are also lowered so that the storage capacitance may be reduced. As the result, the high speed touch sensing is not possible.

Further, as shown in FIG. 3, when forming the contact holes TH and WH for connecting the touch electrode Tx and the routing line TW, the contact hole may be required to have enough area for ensuring good contact. In order to prevent reduction of aperture ratio, it is preferable that the contact holes TH and WH are disposed as being overlapped with the lines or close to the lines. However, in the ultra high density structure, the area of the pixel area PA is smaller and the elements are closer, so that it is very hard to ensure the area of the contact hole for good contact.

As mentioned above, for the in-cell touch type flat panel display, especially for the ultra high density display, the contact hole connecting the touch electrode and the routing line has the minimum open area and the minimum disposed area. To do so, it is required to develop an in-cell type touch panel embedded flat panel display having different structure than the related art.

SUMMARY

In order to overcome the above mentioned drawbacks, the purpose of the present disclosure is to provide a display having a touch sensor in which the parasitic capacitance between the touch electrode and the routing line is eliminated. Another purpose of the present disclosure is to provide a display having a touch sensor in which the storage capacitance between the pixel electrode and the common electrode is sufficient and the parasitic capacitance between the touch electrode and the routing line is prevented. Still another purpose of the present disclosure is to suggest a display having a touch sensor in which the aperture ratio is not reduced in ultra high density structure by minimizing the area of the contact hole for connecting the touch electrode and the routing line.

In order to accomplish the above purpose, the present disclosure suggests a display having a touch sensor comprising: a plurality of pixel areas disposed in a matrix manner on a substrate; a routing line along a first direction on the substrate; a first passivation layer covering the routing line; a touch electrode covering the routing line and corresponding to a grouped pixel areas on the first passivation layer; a touch contact hole exposing some portions of the routing line by penetrating the touch electrode and the first passivation layer; a second passivation layer covering the touch electrode; a passivation contact hole exposing the touch contact hole and some portions of the touch electrode around the touch contact hole by penetrating the second passivation layer; and a touch terminal connecting the touch electrode and the routing line on the second passivation layer.

In one embodiment, the display further comprises: a data line overlapping with the routing line having a planar layer there-between on the substrate; a gate line running along a second direction crossing with the first direction on the substrate; a thin film transistor connected to the gate line and the data line and disposed in the pixel area under the planar layer; and a pixel electrode disposed within the pixel area on the second passivation layer, connected to the thin film transistor and overlapped with the touch electrode having the second passivation layer there-between.

In one embodiment, exposed areas of the routing line by the touch contact hole and the passivation contact hole are equal to or larger than 2 µm².

In one embodiment, exposed areas of the routing line by the touch contact hole and the passivation contact hole are less than 3 times of exposed areas of the touch electrode by the passivation contact hole.

In one embodiment, the touch contact hole and the passivation contact hole have an asymmetric structure.

In one embodiment, any one of the touch contact hole and the passivation contact hole has a landscape rectangular shape, and the other has a portrait rectangular shape.

In one embodiment, any one of the touch contact hole and the passivation contact hole is disposed as being shifted to any one side from the other.

In one embodiment, any one of the touch contact hole and the passivation contact hole is disposed as being shifted to a side where there is no other contact hole.

The present disclosure suggests flat panel display having a touch sensor in which the parasitic capacitance between the touch electrode and the routing line is reduced so that accuracy sensing performance can be improved, in the ultra high density display. Further, in the ultra high density display, by thinning the insulating layer between the common electrode and the pixel electrode, a large amount of the storage capacitance can be provided. The area of contact holes for connecting the touch electrode and the routing line can be minimized. In particular, the two contact holes for exposing the touch electrode and the routing line are overlapped in vertical structure. Further, these contact holes are asymmetrically overlapped in which the contact holes are disposed as concentrating to where there are less contact holes. Therefore, with the minimized contact hole area, the touch electrode can be connected to the routing line. In addition, these two contact holes can be formed with one mask process so that the manufacturing tact time can be reduced and the manufacturing cost can be saved.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
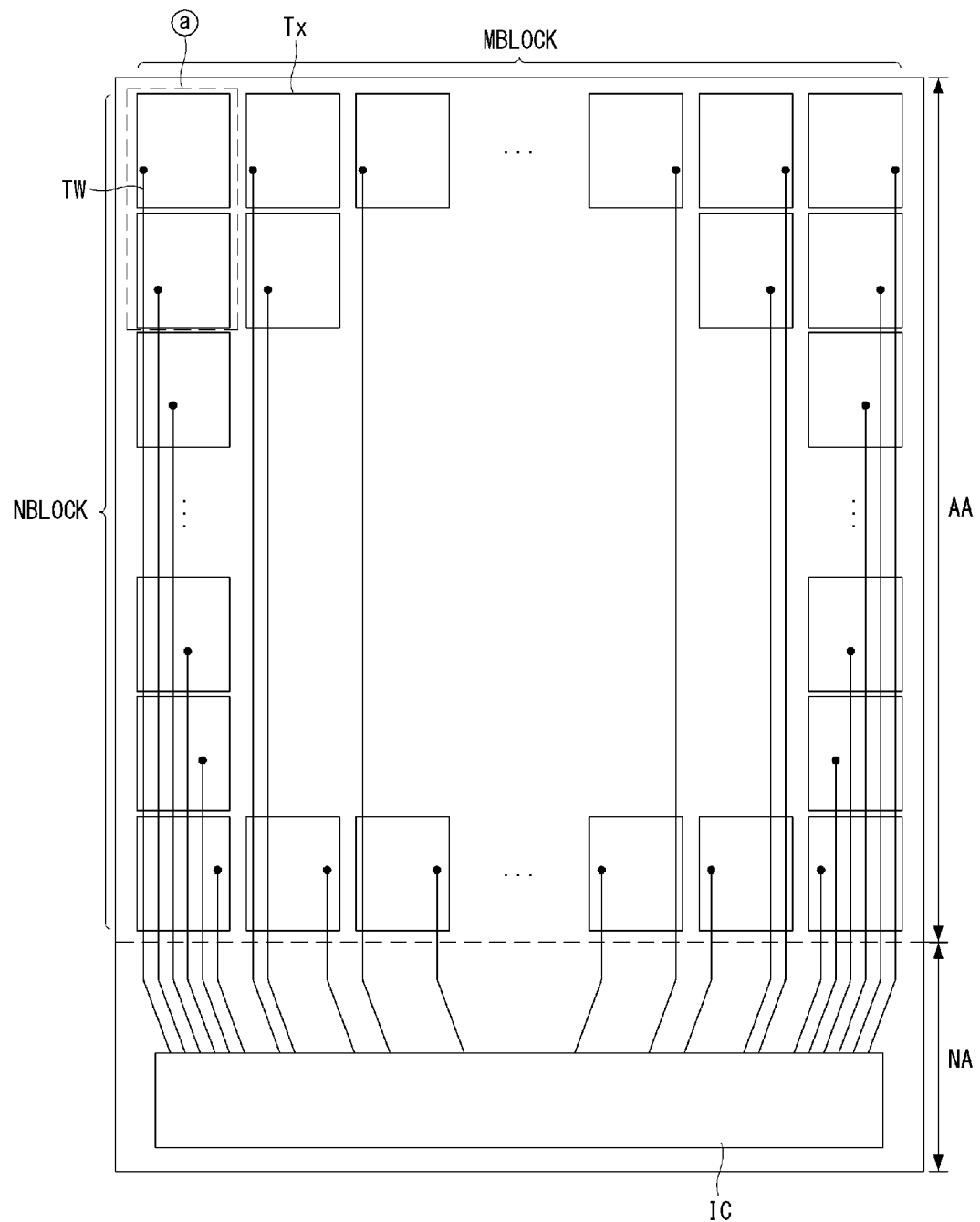
FIG. 1 is a plane view illustrating the structure of the touch sensor embedded display according to the related art.
Figure 2:
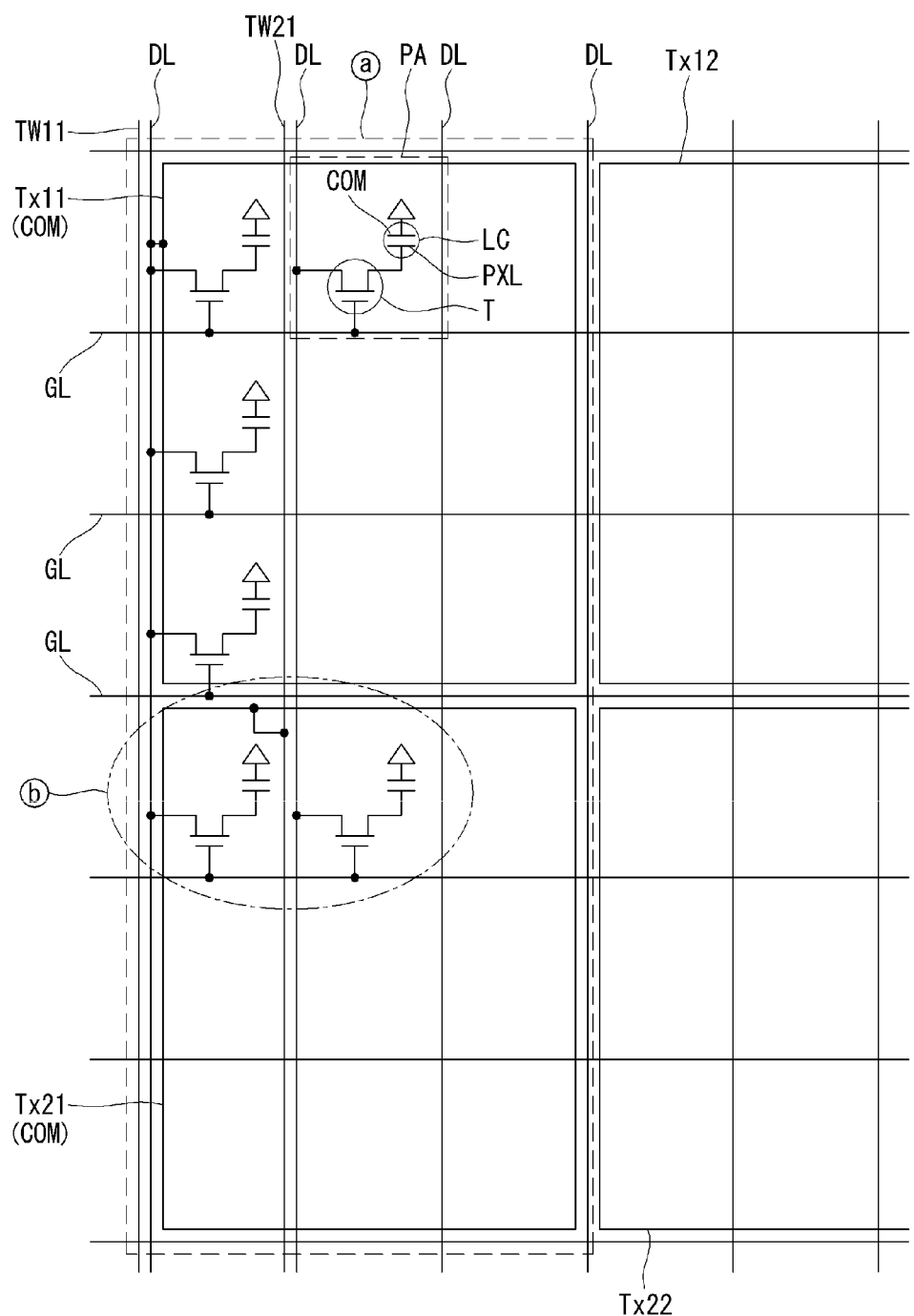
FIG. 2 is a plan view illustrating the enlarged part having two touch electrodes (Tx) denoted as ⓐ in FIG. 1.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit.

First Embodiment

Figure 5:
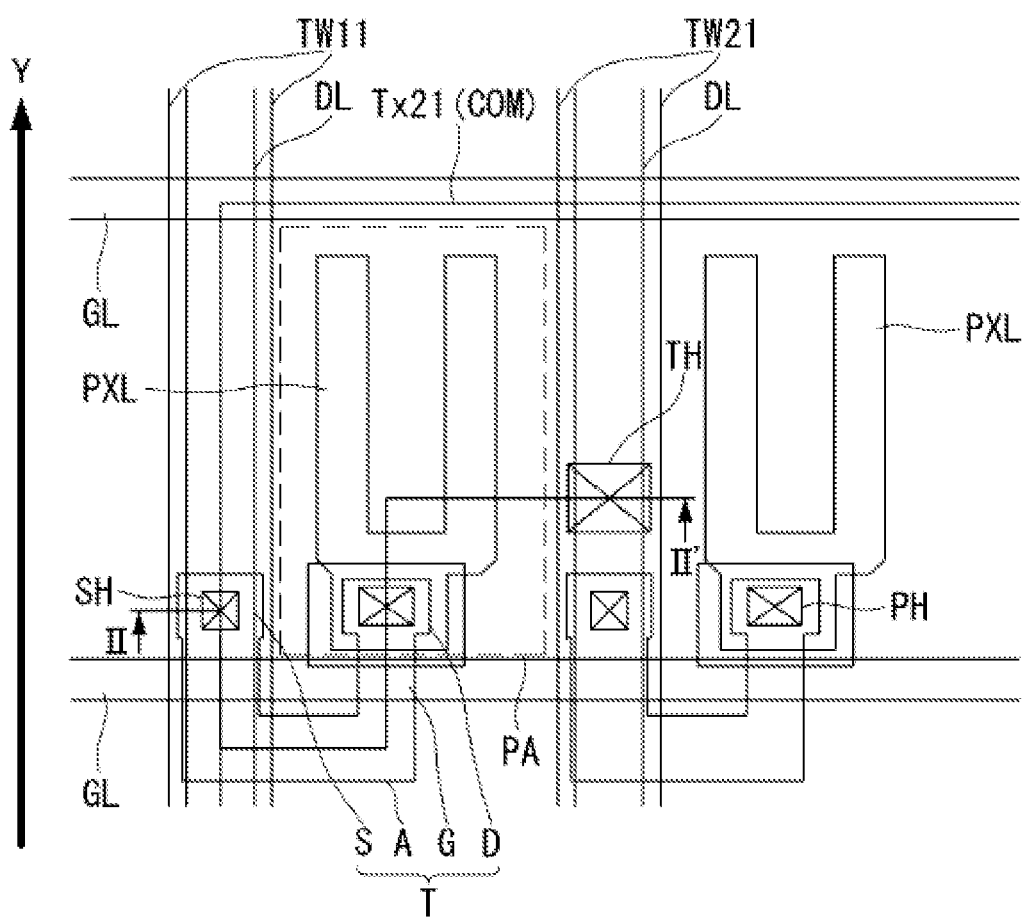
FIG. 5 is a plan view illustrating a structure of a liquid crystal display having a self capacitance touch sensor according to the first embodiment of the present disclosure.
Figure 6:
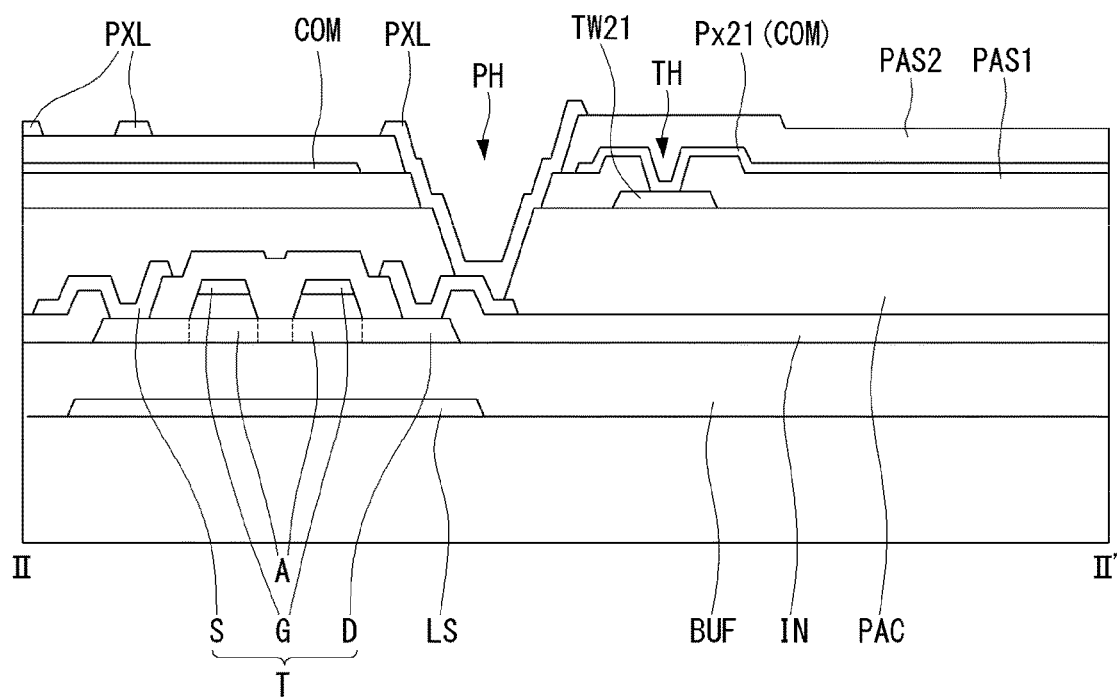
FIG. 6 is a cross section view, along the cutting line II-IF of FIG. 5, illustrating the structure of the liquid crystal display having the self capacitance touch sensor according to the first embodiment of the present disclosure.

FIGS. 5 and 6 illustrate features of the first embodiment of the present disclosure. FIG. 5 is a plan view illustrating a structure of a liquid crystal display having a self capacitance touch sensor according to the first embodiment of the present disclosure. FIG. 6 is a cross section view, along the cutting line II-IF of FIG. 5, illustrating the structure of the liquid crystal display having the self capacitance touch sensor according to the first embodiment of the present disclosure.

Referring to FIGS. 5 and 6, a liquid crystal display having a self capacitance touch sensor according to the first embodiment of the present disclosure has a plurality of pixel areas PA disposed in a matrix manner defined by the crossing structure of a plurality of gate lines GL and a plurality of data lines DL on a substrate SUB. In each pixel area PA, a thin film transistor T, a pixel electrode PXL connected to the thin film transistor T and a common electrode COM facing with the pixel electrode PXL are disposed.

The thin film transistor T may have the double gate structure in which the semiconductor layer is overlapped with the gate line GL twice so that two channel areas A are formed. On the substrate SUB, a light shielding layer LS may be formed where the channel area A is disposed. On the light shielding layer LS, a buffer layer BUF is deposited as covering the whole surface of the substrate SUB. On the buffer layer BUF, a semiconductor layer is disposed where the light shielding layer LS is formed. On the semiconductor layer, a gate line GL and the gate electrode G are disposed with a gate insulating layer GI.

One side of the semiconductor layer is connected to the date line DL. The semiconductor layer has 'U' shape so as to cross the gate line GL twice. The overlapped portion of the gate line GL with the semiconductor layer would be the gate electrode G. The portions of the semiconductor layer overlapped with the gate electrode G would be the channel area A. On the whole surface of the substrate SUB having the gate line GL and the gate electrode G, an intermediate insulating layer IN is deposited.

On the intermediate insulating layer IN, data line DL is disposed. One portion of the data line DL is connected to the one side of the semiconductor layer. The other side of the semiconductor layer is connected to the drain electrode D. Here, the source electrode S is not formed separately but is defined as the portion of the data line DL overlapped with the semiconductor layer. The drain electrode D may be formed separately. Otherwise, one portion of the pixel electrode PXL connected to the other side of the semiconductor layer may be the drain electrode D.

On the whole surface of the substrate SUB having the thin film transistor T including the gate electrode G, the source electrode S and the drain electrode D, a planar layer PAC is deposited. On the planar layer PAC, a routing line TW is disposed. Especially, in order to ensure high aperture ratio, it is preferable that the routing line TW is overlapped with the data line DL. On the whole surface of the substrate SUB having the routing line TW, a first passivation layer PAS1 is deposited.

One routing line TW is connected to any one touch electrode Tx. By patterning the first passivation layer PAS1, a touch contact hole TH exposing some portions of any one routing line TW is formed. On the first passivation layer PAS1 having the touch contact hole TH, a common electrode COM is disposed. In order to be used as the touch electrode Tx, the common electrode COM may be patterned as covering a plurality neighboring pixel areas PA. Here, the common electrode COM is connected to the routing line TW through the touch contact hole TH. When the common electrode COM works as the touch electrode Tx, the touch sensing information can be sent via the routing line TW from the touch electrode Tx. It is preferable that the common electrode COM, also being a touch electrode Tx, has the open structure not covering the pixel contact hole PH exposing the drain electrode D.

On the whole surface of the substrate SUB having the common electrode COM, a second passivation layer PAS2 is deposited. Patterning the second passivation layer PAS2, the first passivation layer PAS1 and the planar layer PAC, some portions of the drain electrode D are exposed. On the second passivation layer PAS2, a pixel electrode PXL is disposed. The pixel electrode PXL is connected to the drain electrode D of the thin film transistor T through the pixel contact hole PH. Within the pixel area PA, the pixel electrode PXL is disposed as overlapping the common electrode COM with the second passivation layer PAS2 there-between. A storage capacitance may be formed at the overlapped area between the pixel electrode PXL and the common electrode COM.

Figure 3:
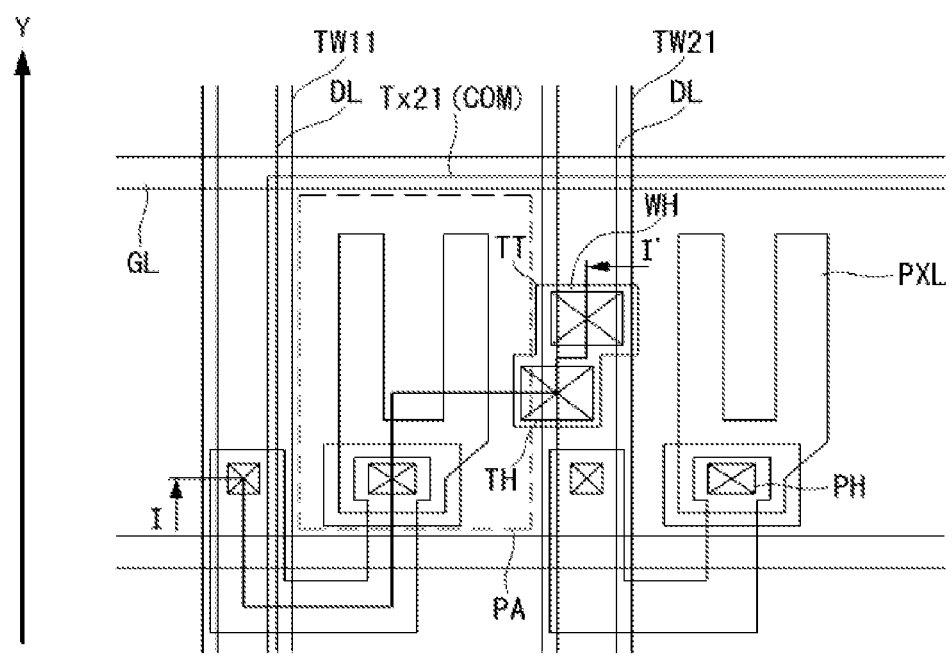
FIG. 3 is a plan view illustrating an enlarged area including two neighboring pixels denoted as ⓑ in FIG. 2 according to the related art.
Figure 4:
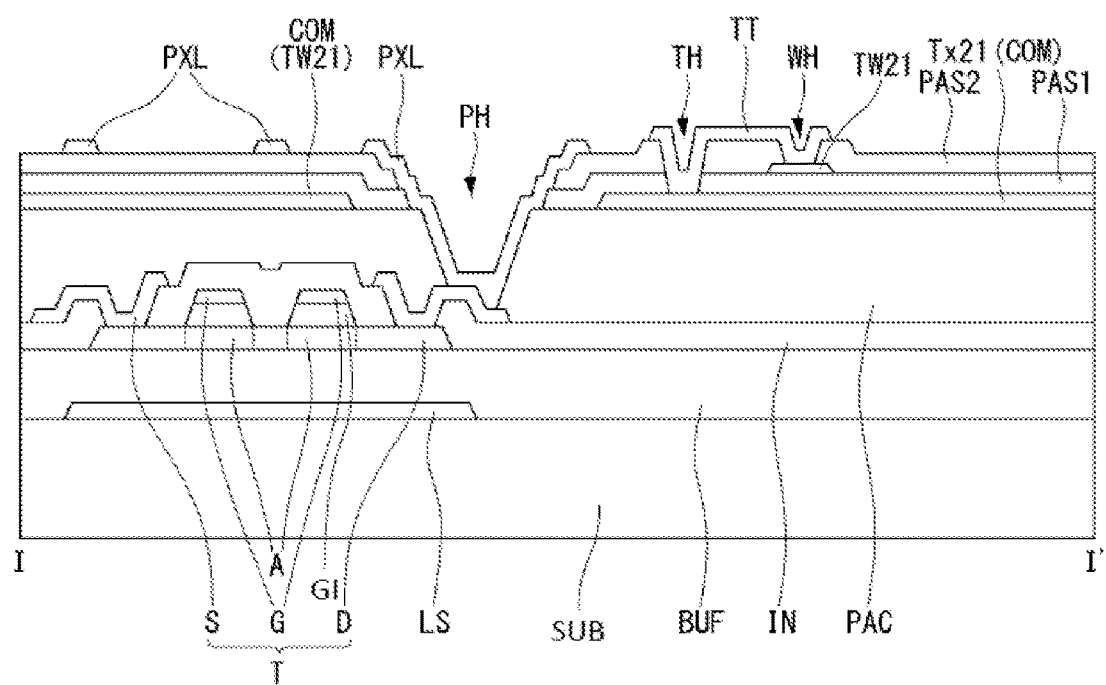
FIG. 4 is a cross section view, along the cutting line IT of FIG. 3, illustrating the structure of the liquid crystal display having the self capacitance (type) touch sensor according to the related art.

In the first embodiment of the present disclosure, the touch terminal TT for connecting the touch electrode Tx to the routing line TW (described previously with reference to FIG. 3) is not formed, but the touch electrode Tx is directly connected to the routing line TW. Especially, the routing line TW is formed first, the first passivation layer PAS1 is deposited thereon. Then, the touch contact hole TH exposing some portions of the routing line TW is formed. Forming the touch electrode Tx on the first passivation layer PAS1, the touch electrode Tx can connect to the routing line TW through the touch contact hole TH.

For the liquid crystal display embedding the self capacitance touch sensor according to the first embodiment of the present disclosure, the touch contact hole TH for connecting the touch electrode Tx and the routing line TW can have the reduced area for ensuring good contact property. Further, as the touch contact hole TH is formed at the area for the data line DL, the aperture ratio is not reduced by the touch contact hole area.

The routing line TW extends along to the second direction, i.e., Y-axis, so it may be overlapped with other touch electrodes Tx arrayed along to the Y-axis. For example, 2row 1column routing line TW21 is connected to the 2row 1column touch electrode Tx21, and is overlapped with the other touch electrodes Tx below the 2row 1column touch electrode Tx21 along to the Y-axis with the first passivation layer PAS1 there-between.

When any parasitic capacitance between the 2row 1column routing line TW21 and other touch electrodes Tx is present, the sensing accuracy of the touch electrodes Tx may be degraded. Therefore, it is important to provide high insulating property between the touch electrode Tx and the routing line TW. For example, the first passivation layer PAS1 may have thickness of 2,000 Å or more, so that the electrostatic noise between the touch electrode Tx and the routing line TW can be reduced.

Between the pixel electrode PXL and the common electrode COM, there is the second passivation layer PAS2 only. Therefore, even though the first passivation layer PAS1 is too thick (thicker than 2,000 Å) for high insulating property, the storage capacitance between the pixel electrode PXL and the common electrode COM is not degraded.

Second Embodiment

Figure 7:
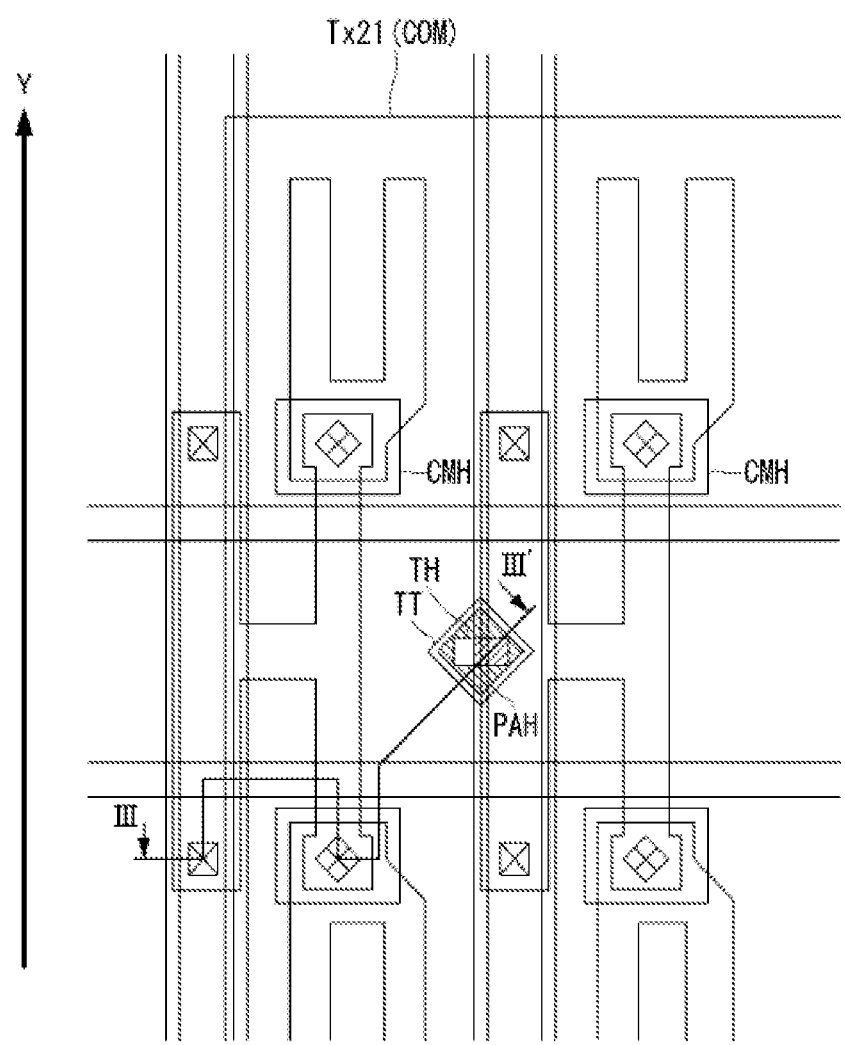
FIG. 7 is a plan view illustrating a structure of a liquid crystal display having a self capacitance touch sensor according to the second embodiment of the present disclosure.
Figure 8:
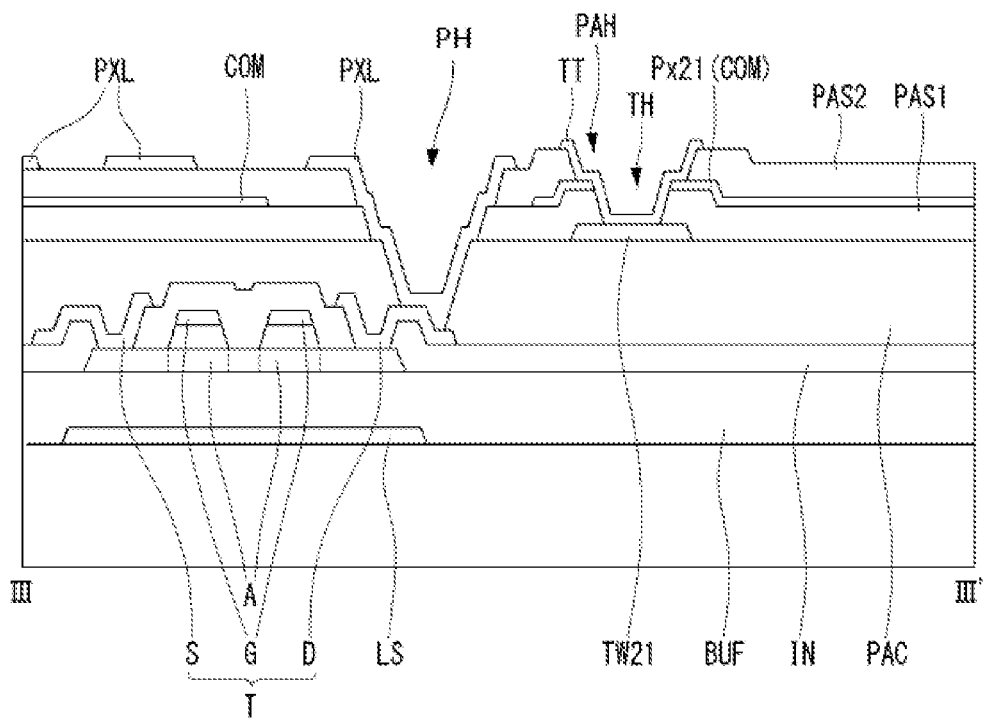
FIG. 8 is a cross section view, along the cutting line III-III' of FIG. 7, illustrating the structure of the liquid crystal display having the self capacitance touch sensor according to the second embodiment of the present disclosure.

FIGS. 7 and 8 illustrate the second embodiment of the present disclosure. FIG. 7 is a plan view illustrating a structure of a liquid crystal display having a self capacitance touch sensor according to the second embodiment of the present disclosure. FIG. 8 is a cross section view, along the cutting line III-III' of FIG. 7, illustrating the structure of the liquid crystal display having the self capacitance touch sensor according to the second embodiment of the present disclosure.

Referring to FIGS. 7 and 8, a liquid crystal display embedding a self capacitance touch sensor according to the second embodiment of the present disclosure has a plurality of pixel areas PA disposed in a matrix manners defined by the crossing structure of a plurality of gate lines GL and a plurality of data lines DL on a substrate SUB. In each pixel area PA, a thin film transistor T, a pixel electrode PXL connected to the thin film transistor T and a common electrode COM facing with the pixel electrode PXL are disposed.

The structure of the thin film transistor may be same as that of the first embodiment. Therefore, corresponding explanation may not be duplicated.

On the whole surface of the substrate SUB having the thin film transistor T including the gate electrode G, the source electrode S, and the drain electrode D, a planar layer PAC is deposited. On the planar layer PAC, a routing line TW is disposed. Especially, in order to ensure high aperture ratio, it is preferable that the routing line TW is overlapped with the data line DL. On the whole surface of the substrate SUB having the routing line TW, a first passivation layer PAS1 is deposited.

On the first passivation layer PAS1, a common electrode COM is disposed. In order to be used as the touch electrode Tx, the common electrode COM may be patterned as covering a plurality neighboring pixel areas PA. Here, the common electrode COM may be overlapped with the routing line TW. Further, it is preferable that the common electrode COM, also being a touch electrode Tx, has the open structure not covering the pixel contact hole PH exposing the drain electrode D. For example, it is preferable that a common hole CMH exposing circumstances of the pixel contact hole PH is formed, when forming the common electrode COM. Any one routing line TW should be connected to any one touch electrode Tx. Here, at the mask process for patterning the common electrode COM, more patterning the overlapped area between the common electrode COM and the routing line TW, the touch contact hole TH may be formed as exposing some portions of the routing line TW. The touch contact hole TH exposes some portions of the routing line TW by penetrating the common electrode COM and the first passivation layer PAS1.

On the whole surface of the substrate SUB having the common electrode COM, a second passivation layer PAS2 is deposited. Patterning the second passivation layer PAS2, the first passivation layer PAS1 and the planar layer PAC, a pixel contact hole PH exposing some portions of the drain electrode D is formed. Here, by patterning the second passivation layer PAS2 covering the touch contact hole TH, a passivation contact hole PAH exposing the touch contact hole TH is formed. The passivation contact hole PAH may be patterned as having larger area than the touch contact hole TH or as having an asymmetric shape to expose some portions of the common electrode COM surrounding the touch contact hole TH.

On the second passivation layer PAS2, a pixel electrode PXL is disposed. The pixel electrode PXL connects to the drain electrode D of the thin film transistor T through the pixel contact hole PH. Within the pixel area PA, the pixel electrode PXL is disposed as overlapping the common electrode COM with the second passivation layer PAS2 there-between. A storage capacitance may be formed at the overlapped area between the pixel electrode PXL and the common electrode COM. Here, a touch terminal TT is further formed with the same material of the pixel electrode PXL but it is separated from the pixel electrode PXL. The touch terminal TT connects the touch electrode Tx exposed through the passivation contact hole PAH and the routing line TW exposed through the touch contact hole TH. When using as the touch electrode Tx, the common electrode COM can send the sensing information via the routing line TW.

For the liquid crystal display embedding the self capacitance touch sensor according to the second embodiment of the present disclosure, the touch contact hole TH for connecting the touch electrode Tx and the routing line TW can have the minimized area for providing good contact property. Further, as the touch contact hole TH and the touch terminal TT are formed at the area for the data line DL, the aperture ratio is not reduced by these areas.

The routing line TW extends along to the second direction, i.e., Y-axis, so it may be overlapped with other touch electrodes Tx arrayed along to the Y-axis. For example, 2row 1column routing line TW21 is connected to the 2row 1column touch electrode Tx21, and is overlapped with the other touch electrodes Tx below the 2row 1column touch electrode Tx21 along to the Y-axis with the first passivation layer PAS1 there-between.

When any parasitic capacitance between the 2row 1column routing line TW21 and other touch electrodes Tx is occurred, the sensing accuracy of the touch electrodes Tx may be degraded. Therefore, it is important to provide high insulating property between the touch electrode Tx and the routing line TW. For example, the first passivation layer PAS1 may have thickness of 2,000 Å or more, so that the electrostatic noise between the touch electrode Tx and the routing line TW can be reduced.

Between the pixel electrode PXL and the common electrode COM, there is the second passivation layer PAS2 only. Therefore, even though the first passivation layer PAS1 is too thick (thicker than 2,000 Å) for high insulating property, the storage capacitance between the pixel electrode PXL and the common electrode COM is not degraded.

Further, in the second embodiment, the touch contact hole TH and the passivation contact hole PAH for connecting the touch electrode Tx and the routing line TW are formed without additional mask processes. By comparing with the first embodiment, the manufacturing process can be more simplified.

In detail, the first embodiment requires a first mask process for forming the routing line TW, a second mask process for forming the touch contact hole TH at the first passivation layer PAS1, a third mask process for forming the common electrode COM, a fourth mask process for forming the pixel contact hole PH at the second passivation layer PAS2, and a fifth mask process for forming the pixel electrode PXL on the second passivation layer PAS2. That is, from the step for forming the routing line TW to the step for forming the touch electrode Tx, the first embodiment requires at least 5 mask processes.

In the interim, the second embodiment requires a first mask process for forming the routing line TW, a second mask process for forming the common electrode COM and the touch contact hole TH on the first passivation layer PAS1, a third mask process for forming the pixel contact hole PH and the passivation contact hole PAH at the second passivation layer PAS2, and a fourth mask process for forming the pixel electrode PXL and the touch terminal TT on the second passivation layer PAS2. That is, from the step for forming the routing line TW to the step for forming the touch electrode Tx, the second embodiment requires 4 mask processes.

In the first embodiment, the contact hole for connecting the touch electrode Tx and the routing line TW is the touch contact hole TH. However, in the second embodiment, there are two contact holes for connecting the touch electrode Tx and the routing line TW, the passivation contact hole PAH and the touch contact hole TH. As these two contact holes PAH and TH are overlapped in vertical structure, the area for the contact holes can be minimized. This contact hole structure can be applied to the ultra high density flat panel display.

In the market for the flat panel display, the resolution density is getting higher, from the high density (or HD), the full high density (or FHD), the ultra high density (or UHD) to the ultra plus high density (UHD+, over 5K). Therefore, the space for embedding the touch sensor is getting smaller.

As mentioned above, the space for disposing the contact hole connecting the touch electrode Tx and the routing line TW is getting smaller or narrower.

Figure 9A:
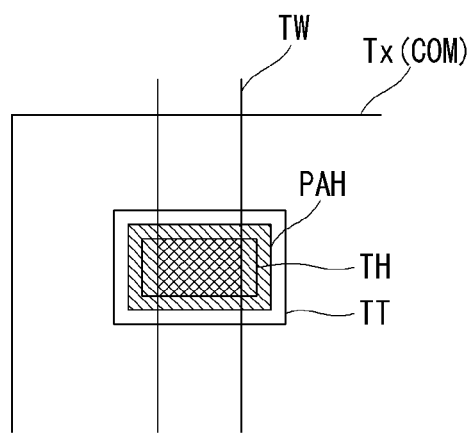
FIGS. 9A to 9C are plan views illustrating various examples of touch contact holes for connecting the touch electrode and the routing line in a liquid crystal display having a self capacitance touch sensor according to the second embodiment of the present disclosure.
Figure 9B:
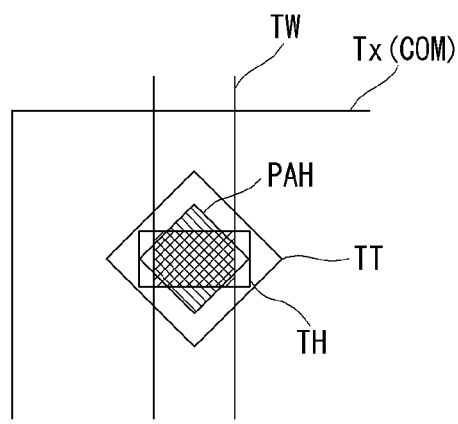
Figure 9C:
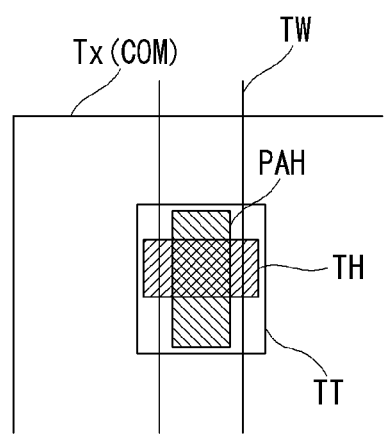

In order to overcome these restrictions, in the second embodiment of the present disclosure, the passivation contact hole PAH and the touch contact hole TH are formed and/or disposed in an asymmetric structure. Doing so, it is possible to suggest an ultra high density flat panel display (over 4K) embedding the touch sensor. FIGS. 9A to 9C illustrate the asymmetric structure of the contact holes. FIGS. 9A to 9C are plane views illustrating various examples of touch contact holes for connecting the touch electrode and the routing line in a liquid crystal display having a self capacitance touch sensor according to the second embodiment of the present disclosure.

At first, FIG. 9A is a plane view illustrating the contact holes having an asymmetric structure. As shown in FIG. 9A, in order to expose the routing line TW, a touch contact hole TH is formed by patterning the touch electrode Tx21 and the first passivation layer PAS1 there-under. Here, the touch contact hole TH may have any one shape of an ellipse, a circle, a perfect square, a lozenge, a rectangle and so on, properly to expose some portions of the routing line TW. Here, in convenience, a rectangular shaped contact hole is presented as an example. In FIG. 9A, the hatch pattern of 45° angle line means the some portions of the routing line TW exposed by the touch contact hole TH.

By depositing the second passivation layer PAS2 covering the touch electrode Tx and then etching some portions of the second passivation layer PAS2 covering the touch contact hole TH, the passivation contact hole PAH is formed as exposing the touch contact hole TH and some portions of the touch electrode Tx surrounding the touch contact hole TH. In FIG. 9A, the hatch pattern of 135° angle line means the areas exposed through the passivation contact hole PAH. That is, the areas marked only by the 135° angle line means the some portions of the touch electrode Tx surrounding the touch contact hole TH and exposed by the passivation contact hole PAH.

On the second passivation layer PAS2, the touch terminal TT is formed as having larger size than the touch contact hole TH. The touch terminal TT may cover all areas marked by both hatch patterns. That is, some portions of the routing line TW marked by the hatch pattern of 45° angle line and some portions of the touch electrode Tx marked by the hatch pattern of 135° angle line are connected by the touch terminal TT.

In FIG. 9A, the touch contact hole TH and the passivation contact hole PAH have the same shape and they are disposed in a symmetric structure. Therefore, when other contact holes may be disposed near them, it is required that the sizes of the touch contact hole TH and the passivation contact hole PAH may be smaller. When the sizes of the touch contact hole TH and the passivation contact hole PAH are too small, the areas for exposing the routing line TW and the touch electrode Tx are smaller, too. As the result, the contact of the touch terminal TT between the routing line TW and the touch electrode Tx may not have good property.

In some embodiments, the contact holes have an asymmetric structure. In order to provide enough contact area when other contact holes are disposed around any one contact hole in the ultra high density flat panel display, it is preferable that the contact holes have the asymmetry structure. For example, as shown in FIG. 9B, the touch contact hole TH is formed as exposing some portions of the routing line TW by patterning the touch electrode Tx21 and the first passivation layer PAS1 there-under. Like the FIG. 9A, the touch contact hole TH may have any one shape of an ellipse, a circle, a square, a lozenge, a rectangle and so on, properly to expose some portions of the routing line TW. Further, in convenience for comparing with FIG. 9A, the touch contact hole TH has the rectangular shape. In FIG. 9B, the hatch pattern of 45° angle line indicate portions of the routing line TW exposed by the touch contact hole TH.

By depositing the second passivation layer PAS2 covering the touch electrode Tx and then etching some portions of the second passivation layer PAS2 covering the touch contact hole TH, the passivation contact hole PAH is formed as exposing some of the touch contact hole TH and some portions of the touch electrode Tx surrounding the touch contact hole TH. Especially, the passivation contact hole PAH has a different shape from the touch contact hole TH. For example, the passivation contact hole PAH may have a lozenge shape. When other contact holes are disposed at right and/or left sides of the touch contact hole TH, the touch contact hole TH may have the vertically long lozenge shape in which the Y-axis line would be longer and X-axis would be shorter.

In FIG. 9B, the hatch pattern of 135° angle line means the areas exposed through the passivation contact hole PAH. As shown in FIG. 9B, the exposed portions of the touch electrode Tx by the passivation contact hole PAH are the upper portions and lower portions from the touch contact hole TH. In other words, the areas marked only by 135° angle line indicate portions of the touch electrode Tx surrounding the touch contact hole TH and exposed by the passivation contact hole PAH.

On the second passivation layer PAS2, the touch terminal TT is formed as having larger size than the touch contact hole TH. The touch terminal TT may cover all areas marked by both hatch patterns. That is, some portions of the routing line TW marked by the hatch pattern of 45° angle line and some portions of the touch electrode Tx marked by the hatch pattern of 135° angle line are connected by the touch terminal TT.

In the asymmetric structure like in FIG. 9B, the passivation contact hole PAH and the touch contact hole TH may have different shapes. Further, it is preferable that it may have longer axis to avoid meeting with other contact holes.

FIG. 9C shows another example for contact holes having an asymmetric structure. The contact hole structure as shown in FIG. 9C can be applied when any other contact holes are disposed around the touch contact hole in any direction. Referring to FIG. 9C, the touch contact hole TH is formed as exposing some portions of the routing line TW by patterning the touch electrode Tx21 and the first passivation layer PAS1 there-under. In comparison with FIG. 9A, the touch contact hole TH of FIG. 9B has a rectangular shape. In FIG. 9C, the hatch pattern of 45° angle line means the some portions of the routing line TW exposed by the touch contact hole TH.

By depositing the second passivation layer PAS2 covering the touch electrode Tx and then etching some portions of the second passivation layer PAS2 covering the touch contact hole TH, the passivation contact hole PAH is formed as exposing some of the touch contact hole TH and some portions of the touch electrode Tx surrounding the touch contact hole TH. In particular, the passivation contact hole PAH has a different shape from the touch contact hole TH. Further, the disposed structure is also asymmetric. For example, the passivation contact hole PAH has rectangular shape of which long axis is different from the long axis of the touch contact hole TH. When the touch contact hole TH is the landscape rectangular shape and other contact holes are disposed at right and/or left sides of the touch contact hole TH, the passivation contact hole PAH may be the portrait rectangular shape. When still other contact holes are disposed above the touch contact hole TH, then the passivation contact hole PAH may have much longer portrait rectangular shape.

In FIG. 9C, the hatch pattern of 135° angle line indicate the areas exposed through the passivation contact hole PAH. As shown in FIG. 9C, the exposed portions of the touch electrode Tx by the passivation contact hole PAH are the lower portions from the touch contact hole TH. In other words, the areas marked only by 135° angle line means the some portions of the touch electrode Tx disposed below the touch contact hole TH and exposed by the passivation contact hole PAH.

On the second passivation layer PAS2, the touch terminal TT is formed as having larger size than the touch contact hole TH and the passivation contact hole PAH. The touch terminal TT may cover all areas marked by both hatch patterns. That is, some portions of the routing line TW marked by the hatch pattern of 45° angle line and some portions of the touch electrode Tx marked by the hatch pattern of 135° angle line are connected by the touch terminal TT.

In the asymmetric structure like FIG. 9C, the passivation contact hole PAH and the touch contact hole TH may have different shapes. Further, it is preferable that the overlapped two contact holes may have longer axis to avoid meeting with other contact holes, or any one of the two overlapped contact holes may be disposed as shifted one side. In the present disclosure, the asymmetric structure of the vertically overlapped two contact holes means that two contact holes have different shapes and/or that two contact holes are disposed in a manner that the center point of any one contact hole is not aligned on the center point of the other contact hole.

Even though the overlapped two contact holes are disposed in an asymmetric structure, the exposed areas of the routing line TW by the touch contact hole TH and the exposed areas of the touch electrode Tx by the passivation contact hole PAH may be enough to provide good contact property. It is preferable that the areas of the exposed portions are satisfied following conditions.

At first, it is preferable that the overlapped open area of the passivation contact hole PAH and the touch contact hole TH is equal or larger than 2 $\mu m^2$. In the cases of the FIGS. 9B and 9C, the passivation contact hole PAH exposes all portions of the routing lines TW exposed by the touch contact hole TH. Therefore, the overlapped open area is equal to the exposed area of the routing line TW. When it is required that the size of the passivation contact hole PAH, the passivation contact hole PAH may expose some of the exposed routing line TW by the touch contact hole TH. At any case, it is preferable that the finally opened areas of the exposed routing line TW by the passivation contact hole PAH and the touch contact hole TH are larger than 2 $\mu m^2$. If the finally opened areas of the exposed routing line TW are smaller than 2 $\mu m^2$, the contact resistance may be increased so that the touch information detected by the touch electrode Tx may not be sent via the routing line TW, properly.

Finally, it is preferable that the overlapped open area of the passivation contact hole PAH and the touch contact hole TH is less than 3 times of the unoverlapped opened area of the passivation contact hole PAH with the touch contact hole TH. The unoverlapped opened area of the passivation contact hole PAH with the touch contact hole TH means the area of the exposed touch electrode Tx by the passivation contact hole PAH. Therefore, the area of the exposed routing line TW by all of the passivation contact hole PAH and the touch contact hole TH, at least, is the same with the area of the exposed touch electrode Tx by the passivation contact hole PAH. At most, the area of the exposed routing line TW by all of the passivation contact hole PAH and the touch contact hole TH does not need to be larger than 3 times of the exposed touch electrode Tx by the passivation contact hole PAH. Even it is larger than 3 times, the contact resistance is not lowered, but it occupies too much area so that it may reduce the aperture ratio.

In some embodiments, the touch contact hole TH has rectangular shape and the passivation contact hole PAH has an asymmetric shape or disposed with the center is shifted or offset to one direction. This is caused by that the touch contact hole TH is formed former than the passivation contact hole PAH. If required, the shapes of these two contact holes may be exchanged. Further, the touch contact hole TH may be shifted from the passivation contact hole PAH to any side where there are no other contact holes.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A display comprising:
   a plurality of pixel areas disposed in a matrix manner on a substrate;
   a routing line running to a first direction on the substrate;
   a first passivation layer covering the routing line;
   a touch electrode covering the routing line and corresponding to a grouped pixel area on the first passivation layer;
   a touch contact hole exposing some portions of the routing line by penetrating the touch electrode and the first passivation layer overlapped on the routing line;
   a second passivation layer covering the touch electrode;
   a passivation contact hole exposing the touch contact hole and some portions of the touch electrode around the touch contact hole by penetrating the second passivation layer; and
   a touch terminal disposed on the second passivation layer and connecting the touch electrode exposed through the passivation contact hole to the routing line exposed through the touch contact hole.

2. The display according to claim 1, further comprising:
   a data line overlapping with the routing line having a planar layer there-between on the substrate;
   a gate line running to a second direction crossing with the first direction on the substrate;
   a thin film transistor connected to the gate line and the data line and disposed in a pixel area under the planar layer; and
   a pixel electrode disposed within the pixel area on the second passivation layer, connected to the thin film transistor and overlapped with the touch electrode having the second passivation layer there-between.

3. The display according to claim 1, wherein exposed areas of the routing line by the touch contact hole and the passivation contact hole are equal to or larger than 2 $\mu m^2$.

4. The display according to claim 1, wherein exposed areas of the routing line by the touch contact hole and the passivation contact hole are less than 3 times of exposed areas of the touch electrode by the passivation contact hole.

5. The display according to claim 1, wherein the touch contact hole and the passivation contact hole have an asymmetric structure.

6. The display according to claim 5, wherein any one of the touch contact hole and the passivation contact hole has a landscape rectangular shape, and the other has a portrait rectangular shape.

7. The display according to claim 6, wherein any one of the touch contact hole and the passivation contact hole is disposed as being shifted to any one side from the other.

8. The display according to claim 6, wherein any one of the touch contact hole and the passivation contact hole is disposed as being shifted to a side where there is no other contact hole.

* * * * *